United States Patent Office 3,074,774
Patented Jan. 22, 1963

3,074,774
DISCHARGE PRINTING PASTES AND METHODS
OF APPLICATION INVOLVING SAME
Ira Sapers, Newark, and Alton A. Cook, Glen Ridge, N.J., assignors to Arkansas Company, Inc., Newark, N.J., a corporation of New Jersey
No Drawing. Filed Oct. 16, 1959, Ser. No. 846,790
10 Claims. (Cl. 8—69)

This invention relates to discharge printing pastes and methods involving their use and application to dyed and printed textile materials. It is particularly applicable for use on fabrics containing difficultly dischargeable pigments of all types including the phthalocyanine colors. The compounds used in connection with this invention are primarily aryl, long chain alkyl, quaternary ammonium compounds, which are described in the following paragraphs.

The chief component of our discharge printing pastes is the reaction product which may be represented by the following formula:

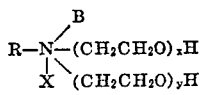

where B is benzyl, benzal, halobenzyl such as chlorobenzyl, xylyl or xylylene; R is a long-chain saturated alkyl group containing 10 to 18 carbon atoms; $x$ and $y$ are each equal to at least 1, the sum of $x+y$ being from 2 to about 30; and X is a member selected from chlorine, bromine and sulfate.

We have found that especially advantageous results in discharge printing on fabrics dyed with all types of pigments including phthalocyanine, are obtained when products of the aforementioned general formula wherein B is benzyl and the sum of $x$ and $y$ is not greater than about 10 are used. The discharge pattern obtained with printing pastes containing these preferred products is sharper, more complete and attained in a shorter period than is the case with the other products which are encompassed by our present invention.

The products useful in accordance with this invention are soluble in water, in polar solvents such as alcohol and, also, in aromatic hydrocarbons such as solvent naphtha. They are resistant to alkalis, including aqueous caustic soda. In appearance, these compounds are amber colored, semi-solid to solid waxy substances at room temperature. They do not have definite melting points.

In general, the substances are prepared by reacting amines having the formula:

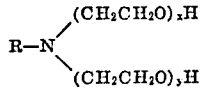

with a benzylating compound, where R, $x$ and $y$ have the same meanings as before. About 1 mol of the benzylating agent to about 1 mol of the amine is normally employed. However, smaller amounts of the benzylating agent may be employed, if desired, e.g., in a closed system, and larger amounts may be employed, if desired, e.g., if the reaction is carried out in an open vessel.

We regard as substances useful within the scope of our invention any products made by reacting from about ¾ to 1¼ mol equivalents of a benzylating agent with about 1 mol of the aforementioned tertiary amines. A mol equivalent of a benzylating agent is that amount of such agent which is capable of furnishing one mole equivalent of a radical designated as B in the aforementioned formula.

It will be understood by those skilled in the art that the aforesaid products are not necessarily pure chemical substances. Indeed, in practice we find it advantageous, as a practical matter, to produce and use products which are mixtures. The components of such mixtures need not all have the aforementioned general formula. An example of a method by which a mixture all of whose components do conform to the formula in question can be made is one wherein stoichiometric amounts of a benzylating agent and a mixture of tertiary amines is condensed. A mixture of products wherein at least one of the components does not conform to the aforementioned general formula can be made, for example, by condensing ¾ mol of a benzylating agent such as benzyl chloride with 1 mol of a tertiary amine. In this latter case, the reaction product will comprise a quaternary compound, residual tertiary amine and by-products of the reaction.

Preferably, the process used in synthesizing these compounds is carried out by gradually heating the mixture of ingredients to 105° to 110° C., holding this temperature for about 30 minutes, on account of the exothermic nature of the reaction. Then the temperature is raised to 120° to 130° C., for an additional 30 minutes to 3 hours. An alkaline material, such as sodium carbonate, is advantageously employed during the reaction in order to control the rate of reaction and, also, to prevent corrosion when the reaction is carried out in a steel vessel.

Among the reactants having the formula:

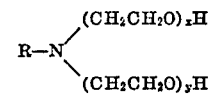

where R is a mixture of alkyl radicals from $C_{12}$ to $C_{18}$ occurring naturally in fats such as coconut oil, soya bean oil, tallow and commercial stearic acid, which may be specifically mentioned are those indicated in the following table, the term Ethomeen being a trademark of Armour and Company, Chicago, Ill.:

| Trade Name | Source of Alkyl Radical | Average Mol. Wt. | $x+y$ | Specific Gravity, 25°/25° C. |
|---|---|---|---|---|
| Ethomeen C/12 | Coconut oil | 303 | 2 | 0.874 |
| Ethomeen C/15 | do | 437 | 5 | 0.976 |
| Ethomeen C/20 | do | 655 | 10 | 1.017 |
| Ethomeen S/12 | Soya bean oil | 367 | 2 | 0.911 |
| Ethomeen S/15 | do | 499 | 5 | 0.951 |
| Ethomeen S/20 | do | 719 | 10 | 1.020 |
| Ethomeen T/12 | Tallow | 365 | 2 | 0.916 |
| Ethomeen T/15 | do | 497 | 5 | 0.966 |
| Ethomeen 18/12 | Stearic acid | 372 | 2 | 0.959 |
| Ethomeen 18/15 | do | 504 | 5 | 0.984 |
| Ethomeen 18/20 | do | 724 | 10 | 1.004 |

Specific benzylating agents which may be used in accordance with this invention include benzyl chloride, benzyl bromide, dibenzyl sulfone, p-chlorobenzyl chloride, benzal chloride ($C_6H_5CHCl_2$), o-, m-, and p-xylyl chloride ($CH_3 \cdot C_6H_4 \cdot CH_2Cl$), and o-, m-, and p-xylylene chloride ($C_6H_4(CH_2Cl)_2$).

These substances are primarily advantageous for use in the discharge printing of fabrics which have been dyed with pigment colors, particularly those of the phthalocyanine type. They may also be used for removal of such pigments from textile materials which have previously been printed with such pigments. We have found that these compounds possess the unexpected property of being excellent agents for use in discharge printing. In this connection, we have found that, whereas other quaternary compounds either are devoid of such property or require 20–30 minutes to produce a satisfactory discharge, the present products permit such a discharge in a much shorter time, i.e., in about 5–10 minutes.

It is known that textile materials dyed with phthalocyanine pigments cannot be treated in the same manner as materials dyed with azo and other types of pigments, to accomplish removal, since the former pigments are relatively inert as compared to other types.

The present applicants have, indeed, already suggested, in U.S. Patent No. 2,587,597, such removal by the use of compositions containing quaternary ammonium compounds having the formula:

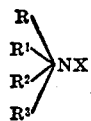

wherein R is a long-chain alkyl group containing 10 to 18 carbon atoms, $R^1$, $R^2$ and $R^3$ represent lower alkyl radicals such as methyl, ethyl or propyl and X is the same as already noted. However, the use of such compounds does not result in sufficiently quick discharge under practical conditions, requiring 30 minutes or longer to produce a satisfactory discharge.

This preferred range of time, 5 to 10 minutes, for the printing discharge process, is required for practical high speed production for textile mills specializing in this type of operation. A discharge time of 30 minutes or over would be impractical for efficient use in textile printing mills.

In employing these compounds for use in discharge printing, we first mix them with water to concentrations of 40% to 80%, and then incorporate these solutions with the gum, a hydrosulfite compound, a non-ionic wetting agent, an alkaline compound and in some cases glycerol, ethylene glycol, glycol ether or other agent which may assist in penetrating the fiber, in accordance with general practice, to make compositions known as discharge printing pastes.

We have found that the permissive and preferred proportions of the ingredients useful to give pastes which will result in the complete discharge of phthalocyanine and other pigments from a textile such as cotton, rayon and nylon in 5–10 minutes are as follows, in parts by weight:

| | Permissive Range | Preferred Range |
|---|---|---|
| Quaternary compound | 1–10 | 3–8 |
| Gum | 10–40 | 20–30 |
| Hydrosulfite | 15–30 | 20–25 |
| Surface-active agent | 0.5–4 | 1–2 |
| Alkaline substance | 5–25 | 10–20 |
| Glycerol or equivalent | 1–10 | 2–5 |
| Water | to 100 parts | to 100 parts |

Gums which may be employed in accordance with the invention include: starches, dextrins, British gums, natural gums, such at tragacanth, locust bean, karaya and alginates. Also water solube cellulose derivatives such as hydroxyethyl cellulose, may be used.

The hydrosulfites which may be employed include sodium formaldehyde sulfoxalate ($NaHSO_2 \cdot CH_2O \cdot 2H_2O$).

The surface-active agents which are used in the compositions of the invention include: alkylaryl polyether alcohols, such as Triton X–100 (Rohm & Haas); alkyl polyoxyethylene alcohols, such as Renex 30 (Atlas Powder Co.); and fatty acid alkanolamides, such as Dergon OM (Arkansas Company, Inc.).

The alkaline substances which we have found useful include: potassium carbonate (potash), sodium carbonate (soda ash), tetrapotassium pyrophosphate and trisodium phosphate.

In place of glycerol we may employ, diethylene glycol, polyethylene glycols, sorbitol, Cellosolve® solvent (ethylene glycol monoethyl ether), pine oil and Kromfax® solvent (thiodiethylene glycol).

In preparing the discharge printing pastes containing the compounds described above, the ingredients are mixed together to form a viscous liquid or paste. The discharge printing paste thus formulated is applied to the pigment treated cloth in the conventional printing operation. The cloth is thoroughly dried, preferably at about 240° F. to 250° F. for 2 to 5 minutes and then is steam-aged for 5 to 10 minutes in the conventional equipment employed for this purpose in a printing plant. To remove any excess of paste the cloth may be scoured at the boil for about 5 minutes with a neutral soap or any suitable synthetic detergent at concentrations of 0.1% up to 0.5%. In some cases it may be desirable to follow the scouring step with a bleach containing hydrogen peroxide or sodium perborate at 0.05% to 0.5% concentration at 100° F. up to 200° F. for 5 to 30 minutes. Sodium hypochloride may be used in the bleaching process if desired, but it is not preferred in connection with this invention.

In order further to illustrate our invention we give the following examples, the parts being by weight unless otherwise specified.

*Example I*

| | Parts |
|---|---|
| Ethomeen T/12 | 40 |
| Ethomeen C/20 | 10 |
| Benzyl chloride | 17 |
| Soda ash | 3 |

The above ingredients are mixed together and heated gradually in a three-neck flask fitted with a stirrer, condenser and thermometer, for about 15 minutes until the temperature reaches 110° C. and held at this temperature for about 30 minutes. The temperature is then raised to about 120° C. and then heating is continued for another 30 minutes. The product of this reaction is a waxy solid material which possesses the other properties of the condensation products already mentioned.

The quaternary compound made in accordance with the foregoing part of the present example was compounded into a so-called discharge printing paste formulation by stirring together the following ingredients in the amounts shown:

| | Parts |
|---|---|
| Quaternary compound | 5 |
| Ambertex gum (National Starch Products, Inc., NY.) | 22 |
| Alkyl polyoxyethylene alcohol (Renex 30) | 1 |
| Pine oil | 4 |
| Sodium formaldehyde sulfoxylate | 22 |
| Potassium carbonate | 17 |
| Water to make 100 parts. | |

There was obtained an amber, semi-opaque, highly viscous liquid or paste.

The paste made in accordance with this example is used as follows:

It is applied to a cotton fabric dyed with a blue phthalocyanine pigment using conventional printing equipment, in such a way as to produce a definite pattern on the dyed goods. After drying at 250° F. for 5 minutes, the processed cloth is then run through a steam ager operated at a pressure of about 15 pounds, at a rate whereby all portions of the cloth are exposed to this steam for between 5 and 10 minutes. After scouring at the boil for 5 minutes using 0.25% of a neutral soap, followed by a treatment in a bath containing 0.2% of sodium perborate at about 140° F. for 5 to 10 minutes, a sharp white pattern is produced on the blue background.

*Example II*

Following the procedure of Example I, a quaternary ammonium product useful in accordance with this invention was prepared, using the following reactants:

| | Parts |
|---|---|
| Ethomeen C/12 | 90 |
| Ethomeen C/20 | 10 |
| Benzyl chloride | 39 |
| Soda ash | 5 |

This mixture is heated gradually to a temperature of 110°–115° C. for about 30 minutes, the temperature then being gradually raised to 120°–125° C. and maintained at this temperature for at least 30 minutes. The entire time of heating was approximately 2 hours.

The product was similar in appearance and properties as that of Example I.

A discharge printing paste was then formulated, as in Example I, with the following ingredients:

| | Parts |
|---|---|
| Quaternary compound of this example | 7 |
| Ambertex gum | 23 |
| Alkyl aryl polyether alcohol (Triton X-100) | 2 |
| Glycerol | 2 |
| Sodium formaldehyde sulfoxylate | 22 |
| Potassium carbonate | 16 |
| Cellosolve solvent (ethylene glycol monoether) | 2 |
| Water | To 100 |

The resulting product was substantially the same in appearance and properties as the printing paste made in accordance with Example I.

The paste made in accordance with this example was used in accordance with the procedure of Example I and was found to give somewhat superior results than that of Example I.

*Example III*

| | Parts |
|---|---|
| Ethomeen 18/12 | 100 |
| Benzyl chloride | 37 |
| Soda ash | 6 |

The Ethomeen was heated in an open beaker to 105° C., and the benzyl chloride was added gradually within about 1 hour while holding the temperature between 105° and 100° C. During this same period, the soda ash was added at intervals. The temperature was then raised to 120° C. and the reaction continued for 45 minutes at 120°–125° C.

The quaternary compound made in accordance with the foregoing part of the present example was compounded into a discharge printing paste as in Example I, using the following ingredients and amounts:

| | Parts |
|---|---|
| Quaternary compound | 3 |
| Ambertex gum | 24 |
| Alkyl polyoxyethylene alcohol (Renex 30) | 2 |
| Sodium formaldehyde sulfoxylate | 22 |
| Potassium carbonate | 14 |
| Cellosolve solvent (ethylene glycolmonoether) | 3 |
| Water | To 100 |

The resulting paste was substantially the same in appearance and properties as that described in Example I.

The paste made in accordance with this example was applied to a cotton fabric dyed with an azo type red pigment (Red C3W, Sherwin-Williams Company) in accordance with the procedure given in Example I with respect to the phthalocyanine pigment-dyed fabric. A sharp white pattern was produced on the red background.

*Example IV*

Following the procedure of Example I a quaternary substance was made from the following reactants:

| | Parts |
|---|---|
| Etthomeen C/12 | 100 |
| Benzyl chloride | 42 |
| Soda ash | 5 |

In this case, the last heating stage was carried out at 120°–125° C. for approximately 1 hour, the entire time of heating being about 2½ hours.

The quaternary substance made in accordance with the foregoing part of this example was compounded into a discharge printing paste as in Example I, using the following ingredients and amounts:

| | Parts |
|---|---|
| Quaternary compound | 7 |
| Ambertex gum | 25 |
| Alkyl aryl polyether alcohol (Triton X-100) | 1 |
| Sodium formaldehyde sulfoxylate | 21 |
| Potassium carbonate | 14 |
| Pine oil | 4 |
| Water | To 100 |

The resulting so-called discharge paste was substantially the same in appearance and properties as that described in Example I.

The paste made in accordance with this example was substituted for the paste of Example I and employed in accordance with that example in discharge printing. Substantially the same results were obtained as in the case of Example II.

This application is a continuation-in-part of our co-pending application Serial No. 707,680, filed January 8, 1958, now abandoned.

The foregoing illustrates the practice of our invention, which, however, is not to be limited thereby, but is to be construed as broadly as permissible in view of the prior art and limited solely by the appended claims.

We claim:

1. A printing paste suitable for use in discharge printing of textiles dyed with phthalocyanine pigments, which is effective within about 10 minutes and which comprises a gum, a hydrosulfite, a non-ionic surface-active agent and the condensation product of about ¾ to about 1¼ mol equivalents of a benzylating agent BX, where B is a member selected from the group consisting of a benzyl, benzal, halobenzyl, xylyl and xylylene and X is a member selected from the group consisting of chlorine, bromine and sulfate, and a mol of a tertiary amine having the formula:

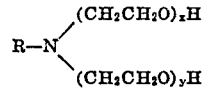

wherein R is a long-chain, saturated, alkyl group containing about 10 to about 18 carbon atoms, $x$ and $y$ are each at least 1, and the sum of $x$ and $y$ is from 2 to about 30.

2. A printing paste suitable for use in discharge printing of textiles dyed with phthalocyanine pigments, which is effective within about 10 minutes and which comprises a gum, a hydrosulfite, a non-ionic surface-active agent and the product of claim 1, wherein said benzylating agents and tertiary amines are employed in stoichiometric amounts.

3. A printing paste suitable for use in discharge printing of textiles dyed with phthalocyanine pigments, which is effective within about 10 minutes and which comprises a gum, a hydrosulfite, a non-ionic surface-active agent and the condensation product of claim 2, wherein X is chlorine and said B is benzyl.

4. A printing paste suitable for use in discharge printing of textiles dyed with phthalocyanine pigments, which is effective within about 10 minutes and which comprises a gum, a hydrosulfite, a non-ionic surface-active agent and the waxy, water-soluble, alkali-resistant condensation product obtained by reacting about 40 parts of a tertiary amine having the formula:

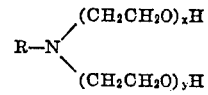

wherein R is the alkyl radical found in tallow and $x$ and $y$ is 2; about 10 parts of a tertiary amine having said formula, wherein R is the alkyl radical found in coconut oil and $x+y$ is 10; and about 17 parts of benzyl chloride.

5. A printing paste suitable for use in discharge printing of textiles dyed with phthalocyanine pigments, which is effective within about 10 minutes and which comprises a gum, a hydrosulfite, a non-ionic surface-active agent and the waxy, water-soluble, alkali-resistant condensation product obtained by reacting about 90 parts of a tertiary amine having the formula:

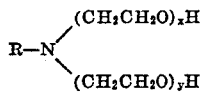

R is the alkyl radical found in coconut oil and $x+y$ is 2; about 10 parts of a tertiary amine having said formula wherein R is the alkyl radical found in coconut oil and $x+y$ is 10; and about 39 parts of benzyl chloride.

6. A printing paste suitable for use in discharge printing of textiles dyed with phthalocyanine pigments, which is effective within about 10 minutes and which comprises a gum, a hydrosulfite, a non-ionic surface-active agent and the waxy, water-soluble, alkali-resistant condensation product obtained by reacting about 100 parts of a tertiary amine having the formula:

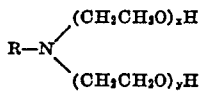

wherein R is an alkyl radical having 18 carbon atoms, and $x+y$ is 2, with about 37 parts of benzyl chloride.

7. A printing paste suitable for use in discharge printing of textiles dyed with phthalocyanine pigments, which is effective within about 10 minutes and which comprises a gum, a hydrosulfite, a non-ionic surface-active agent and the waxy, water-soluble, alkali-resistant condensation product obtained by reacting about 100 parts of a tertiary amine having the formula:

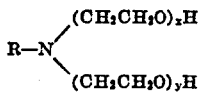

wherein R is an alkyl radical found in coconut oil, and $x+y$ is 2, with about 42 parts of benzyl chloride.

8. A printing paste suitable for use in discharge printing of textiles dyed with phthalocyanine pigments, which is effective within about 10 minutes and which comprises about 7 parts of a product as set forth in claim 5, about 23 parts of a gum, about 2 parts of alkyl aryl polyether alcohol, about 2 parts of glycerol, about 22 parts of sodium formaldehyde sulfoxylate, about 16 parts of potassium carbonate and about 2 parts of an ether-alcohol solvent.

9. A printing paste suitable for use in discharge printing of textiles dyed with phthalocyanine pigments, which is effective within about 10 minutes and which comprises about 3 parts of a product as set forth in claim 6, about 24 parts of a gum, about 2 parts of alkyl polyoxyethylene alcohol, about 21 parts of a sodium formaldehyde sulfoxylate, about 14 parts of potassium carbonate and about 3 parts of an ether-alcohol solvent.

10. A printing paste suitable for use in discharge printing of textiles dyed with phthalocyanine pigments, which is effective within about 10 minutes and which comprises about 7 parts of a product as set forth in claim 7, about 25 parts of a gum, about 1 part of an alkyl aryl polyether alcohol, about 21 parts of sodium formaldehyde sulfoxylate, about 14 parts of potassium carbonate, and about 4 parts of pine oil.

References Cited in the file of this patent

UNITED STATES PATENTS

| | | |
|---|---|---|
| 1,935,217 | Ulrich et al. | Nov. 14, 1933 |
| 2,257,186 | Orthner | Sept. 30, 1941 |
| 2,548,914 | Seiter et al. | Apr. 17, 1951 |
| 2,587,597 | Cook et al. | Mar. 4, 1952 |
| 2,759,975 | Chiddix et al. | Aug. 21, 1956 |
| 2,769,684 | Geigy et al. | Nov. 6, 1956 |
| 2,802,788 | Flaxman | Aug. 13, 1957 |
| 2,902,453 | Matlin | Sept. 1, 1959 |

OTHER REFERENCES

Armour Etho-Chemicals, 25 page booklet, Armour Chemical Division, Armour and Company, Chicago 9, Illinois, 1955, pages 19–25.